United States Patent
Kim et al.

(10) Patent No.: US 12,034,192 B2
(45) Date of Patent: Jul. 9, 2024

(54) IONOMER DISPERSION HAVING HIGH DISPERSION STABILITY, METHOD FOR PRODUCING SAME, AND POLYMER ELECTROLYTE MEMBRANE PRODUCED USING SAME

(71) Applicant: KOLON INDUSTRIES, INC., Seoul (KR)

(72) Inventors: Na Young Kim, Seoul (KR); Dong Hoon Lee, Seoul (KR); Eun Su Lee, Seoul (KR); Jung Hwa Park, Seoul (KR); Seung Jib Yum, Seoul (KR); Chang Hoon Oh, Seoul (KR); Hye Song Lee, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 0 days.

(21) Appl. No.: 17/628,345

(22) PCT Filed: Sep. 29, 2020

(86) PCT No.: PCT/KR2020/013374
§ 371 (c)(1),
(2) Date: Jan. 19, 2022

(87) PCT Pub. No.: WO2021/066544
PCT Pub. Date: Apr. 8, 2021

(65) Prior Publication Data
US 2022/0285715 A1    Sep. 8, 2022

(30) Foreign Application Priority Data

Sep. 30, 2019  (KR) .................. 10-2019-0121034

(51) Int. Cl.
*H01M 8/1039* (2016.01)
*C08L 81/06* (2006.01)
*H01M 8/10* (2016.01)
*H01M 8/1004* (2016.01)
*H01M 8/1067* (2016.01)

(52) U.S. Cl.
CPC ........... *H01M 8/1039* (2013.01); *C08L 81/06* (2013.01); *H01M 8/1004* (2013.01); *H01M 8/1067* (2013.01); *H01M 2008/1095* (2013.01)

(58) Field of Classification Search
CPC ............ H01M 8/1039; H01M 8/1004; H01M 8/1067; H01M 2008/1095; H01M 8/1018; H01M 8/1025; H01M 8/1048; H01M 8/1053; C08L 81/06; C08L 27/18; C08J 2327/18; C08J 5/2237; C09D 127/18; C08F 214/262; Y02E 60/50; Y02P 70/50
See application file for complete search history.

(56) References Cited

U.S. PATENT DOCUMENTS

| | | | | |
|---|---|---|---|---|
| 2004/0028806 | A1* | 2/2004 | Higami | H01M 4/926 427/407.1 |
| 2011/0159402 | A1* | 6/2011 | Honda | H01M 4/8605 525/356 |
| 2013/0189616 | A1 | 7/2013 | Vong | |
| 2013/0224506 | A1* | 8/2013 | Echt | B65D 25/14 156/60 |
| 2018/0251631 | A1 | 9/2018 | Lee | |
| 2019/0245232 | A1 | 8/2019 | Kim | |

FOREIGN PATENT DOCUMENTS

| | | | | |
|---|---|---|---|---|
| CN | 100364880 | C * | 1/2008 | .......... H01M 8/0656 |
| EP | 3536664 | A1 | 9/2019 | |
| JP | 2004075978 | A | 3/2004 | |
| JP | 2005209465 | A | 8/2005 | |
| JP | 2006063305 | A | 3/2006 | |
| JP | 2009249483 | A | 10/2009 | |
| JP | 2010520593 | A | 6/2010 | |
| JP | 2013139573 | A | 7/2013 | |
| JP | 2019531582 | A | 10/2019 | |
| KR | 1020060090526 | A | 11/2006 | |
| KR | 101830291 | B1 | 2/2018 | |
| KR | 101851643 | B1 | 4/2018 | |
| KR | 101851643 | B1 * | 5/2018 | |
| KR | 20180076907 | A * | 7/2018 | |
| KR | 20180076907 | A | 7/2018 | |
| WO | 9952954 | A1 | 10/1999 | |

OTHER PUBLICATIONS

English translation CN-100364880-C as taught by Minagawa (Year: 2008).*
Wkipedia [Viscosity] (Year: 2023).*
Wikipedia [Shear Stress] (Year: 2023).*
KR20180076907A, english translation as taught by Kim (Year: 2018).*
KR 101851643B1 (U.S. Pat. No. 10,818,950 B2 used as equivalent for citations) as taught by Kim (Year: 2018).*
The office action dated Feb. 24, 2023 related to the corresponding Japanese Patent application.
International Search Report dated Jan. 18, 2021.
The office action dated Sep. 26, 2023 related to the corresponding European Patent application.
Lucon Peter et al: "Low-Frequency Acoustic Mixing of Complex and Mul Tiphase Systems", Mixing XXII Conference, Jan. 2010 (Jan. 1, 2010), pp. 1-1.

\* cited by examiner

*Primary Examiner* — Anca Eoff
(74) *Attorney, Agent, or Firm* — Harvest IP Law, LLP

(57) ABSTRACT

Disclosed are: an ionomer dispersion having high dispersion stability while also containing high content of ionomer solids, thus optimizing the ionomer morphology in a polymer electrolyte membrane to allow both the ion conductivity and durability of the polymer electrolyte membrane to be improved; a method for producing the ionomer dispersion; and a polymer electrolyte membrane produced using the method.

14 Claims, 4 Drawing Sheets

IONOMER DISPERSION HAVING HIGH DISPERSION STABILITY, METHOD FOR PRODUCING SAME, AND POLYMER ELECTROLYTE MEMBRANE PRODUCED USING SAME

CROSS REFERENCE TO RELATED APPLICATIONS

This application is a National Stage of International Application No. PCT/KR2020/013374 filed Sep. 29, 2020, claiming priority based on Korean Patent Application No. 10-2019-0121034 filed Sep. 30, 2019.

TECHNICAL FIELD

The present disclosure relates to an ionomer dispersion, a method for preparing the same, and a polymer electrolyte membrane prepared using the same, and more specifically to an ionomer dispersion that exhibits excellent dispersion stability despite having high content of ionomer solids, thereby optimizing the morphology of an ionomer in a polymer electrolyte membrane and improving both the ionic conductivity and the durability of the polymer electrolyte membrane, a method of preparing the same, and a polymer electrolyte membrane prepared using the same.

BACKGROUND ART

A fuel cell that generates electricity through bonding between hydrogen and oxygen has advantages of continuously generating electricity as long as hydrogen and oxygen are supplied and having efficiency about twice as high as that of an internal combustion engine because no heat is lost.

The fuel cell emits fewer pollutants because it directly converts the chemical energy generated by bonding between hydrogen and oxygen into electrical energy. Accordingly, the fuel cell has advantages of being environmentally friendly and alleviating concern over resource depletion caused by increased energy consumption.

A stack that actually generates electricity in the fuel cell has a stacked structure of several to dozens of unit cells, each including a membrane-electrode assembly (MEA) and a separator (also referred to as a "bipolar plate"). The membrane-electrode assembly generally includes an anode, a cathode, and an electrolyte membrane interposed therebetween.

The fuel cell may be classified into an alkaline electrolyte fuel cell, a polymer electrolyte fuel cell (PEMFC) and the like, depending on the type of the electrolyte. Among them, the polymer electrolyte fuel cell is receiving attention as a portable power supply for vehicular and domestic use due to the advantages of a low operating temperature of less than 100° C., quick start-up, rapid response, and excellent durability.

Typical examples of the polymer electrolyte fuel cell include a proton exchange membrane fuel cell (PEMFC), which uses hydrogen gas as a fuel, a direct methanol fuel cell (DMFC), which uses liquid methanol as a fuel, and the like.

For example, in the proton exchange membrane fuel cell (PEMFC), when a fuel such as hydrogen gas is supplied to an anode, the hydrogen at the anode is oxidized to produce a proton ($H^+$) and an electron ($e^-$). The produced proton is transferred to the cathode through the polymer electrolyte membrane, whereas the produced electron is transferred to the cathode through an external circuit. Oxygen supplied to the cathode is bonded to the proton and the electron and is thus reduced, thereby producing water.

Meanwhile, in order to realize commercialization of fuel cells, requirements related to high performance, a long lifetime and the like should be satisfied. One of the electrochemical components having the greatest influence thereon is a membrane electrode assembly. In order to increase the dimensional stability of the polymer electrolyte membrane and thereby improve mechanical durability thereof, a reinforced-composite-membrane-type polymer electrolyte membrane obtained by impregnating a porous support with an ionomer, followed by coating, has been developed.

The porous support has a desirable effect of increasing the mechanical strength of the polymer electrolyte membrane, but has an undesirable effect of increasing the resistance of the polymer electrolyte membrane because it is formed of a material having no ion transport ability. Therefore, in order to secure high performance of the reinforced-composite-membrane-type polymer electrolyte membrane, it is necessary to optimize the morphology of the ionomer present in the porous support.

The ionomer is generally introduced in the form of a dispersion rather than a solution into the porous support and coated thereon, since the hydrophobic backbone and the hydrophilic side chain of the ionomer have different solubilities. Therefore, it is preferable to manufacture as dense a polymer electrolyte membrane as possible by maximizing the concentration of the solid in the dispersion.

However, as the concentration of solid in the dispersion increases, the dispersion stability of the dispersion decreases.

A reinforced-composite-membrane-type polymer electrolyte membrane manufactured from a dispersion having insufficient dispersion stability has a problem in which through-plane resistance is high (that is, the through-plane water channel is not properly formed) due to the low impregnation of the dispersion into the same.

In addition, the low dispersion stability of the dispersion prevents the ionomer from having an appropriate morphology in the polymer electrolyte membrane, thus resulting in a decrease in the in-plane ion conductivity of the polymer electrolyte membrane and an increase in the hydrogen permeability of the polymer electrolyte membrane.

When the hydrogen permeability of the polymer electrolyte membrane is high, the amount of hydrogen gas that moves to the cathode through the polymer electrolyte membrane after being supplied to the anode increases. The hydrogen gas moving to the cathode reacts with the oxygen gas supplied to the cathode to produce hydrogen peroxide and radicals derived therefrom, which cause rapid degradation of the polymer electrolyte membrane.

DISCLOSURE

Technical Problem

Therefore, the present disclosure has been made in view of the above problems, and is directed to an ionomer dispersion, a method for preparing the same, and a polymer electrolyte membrane prepared using the same.

It is one aspect of the present disclosure to provide an ionomer dispersion that exhibits excellent dispersion stability despite having high content of ionomer solids, thereby optimizing the morphology of an ionomer in a polymer electrolyte membrane and improving both the ionic conductivity and the durability of the polymer electrolyte membrane.

It is another aspect of the present disclosure to provide a method of preparing an ionomer dispersion that exhibits excellent dispersion stability despite having high content of ionomer solids, thereby optimizing the morphology of an ionomer in a polymer electrolyte membrane and improving both the ionic conductivity and the durability of the polymer electrolyte membrane.

It is another aspect of the present disclosure to provide a polymer electrolyte membrane having improved ionic conductivity and durability.

In addition to the aspects of the present disclosure described above, other features and advantages of the present disclosure will be disclosed in the following detailed description, as will be clearly understood by those skilled in the art to which the present disclosure pertains.

Technical Solution

In accordance with one aspect of the present disclosure, provided is an ionomer dispersion including: a dispersion medium; and an ionomer solid in the dispersion medium, wherein a concentration of the ionomer solid in the ionomer dispersion is 20% by weight or more, and when a viscosity of the ionomer dispersion is measured using a rheometer while a shear rate is increasing from 0.001 s$^{-1}$ to 1,000 s$^{-1}$ and then decreasing from 1,000 s$^{-1}$ to 0.001 s$^{-1}$, a viscosity ratio of the ionomer dispersion defined by the following Equation 1 is 1.7 or less:

$$\text{Viscosity ratio} = \eta2/\eta1 \quad \text{Equation 1:}$$

wherein η1 is a first viscosity of the ionomer dispersion, measured while the shear rate is increasing, when the shear rate is 1 s-1, and η2 is a second viscosity of the ionomer dispersion, measured while the shear rate is decreasing, when the shear rate is 1 s$^{-1}$.

The first viscosity and the second viscosity may be 1 Pa·s or less.

When a shear stress of the ionomer dispersion is measured using a rheometer while the shear rate is increasing from 0.001 s$^{-1}$ to 1,000 s$^{-1}$ and then decreasing from 1,000 s$^{-1}$ to 0.001 s$^{-1}$, a shear stress ratio of the ionomer dispersion defined by the following Equation 2 may be 1.5 or less:

$$\text{Shear stress ratio} = \sigma2/\sigma1 \quad \text{Equation 2:}$$

wherein σ1 is a first shear stress which is a shear stress of the ionomer dispersion, measured while the shear rate is increasing, when the shear rate is 1 s$^{-1}$, and σ2 is a second shear stress which is a shear stress of the ionomer dispersion, measured while the shear rate is decreasing, when the shear rate is 1 s$^{-1}$.

The first shear stress and the second shear stress may be 1 Pa·s or less.

The ionomer solid may contain a fluorinated ionomer, a hydrocarbon-based ionomer, or a mixture thereof.

The ionomer solid may contain a perfluorinated sulfonic acid-based ionomer (PFSA-based ionomer).

The concentration of the ionomer solid in the ionomer dispersion may be 20 to 50% by weight.

In accordance with another aspect of the present disclosure, provided is a method for preparing an ionomer dispersion including: adding an ionomer to a dispersion medium such that a content of an ionomer solid is adjusted to 20% by weight or more; and mixing the dispersion medium with the ionomer using a resonant acoustic method.

The mixing may include applying acoustic energy with a frequency of 10 to 100 Hz to the dispersion medium and the ionomer, whereby subjecting the dispersion medium and the ionomer to resonant vibration at an acceleration of 50 G to 100 G, wherein G is gravitational acceleration.

The mixing may be performed for 5 to 60 minutes.

The method may further include applying a pressure of 500 to 1,000 bar to a mixture of the dispersion medium and the ionomer, obtained through the mixing.

The pressure may be applied to the mixture when the mixture is flowing.

In accordance with another aspect of the present disclosure, provided is a polymer electrolyte membrane including: a porous support having a plurality of pores; and an ionomer formed by impregnating and coating the porous support with the ionomer dispersion according to any one of claims 1 to 7, and then removing the dispersion medium therefrom.

In accordance with another aspect of the present disclosure, provided is a membrane-electrode assembly including: an anode; a cathode; and the polymer electrolyte membrane interposed between the anode and the cathode.

The general description of the present disclosure is provided only for illustration of the present disclosure, and does not limit the scope of the present disclosure.

Advantageous Effects

In accordance with the present disclosure, an ionomer dispersion having high dispersion stability can be prepared by adding the ionomer to the dispersion medium, followed by mixing in a resonant acoustic method.

In addition, the dispersion stability of the ionomer dispersion can be further increased by applying a high pressure to the mixture obtained through mixing based on a resonant acoustic method.

The ionomer dispersion of the present disclosure, which exhibits sufficiently high dispersion stability despite having a high content of ionomer solid, can optimize the morphology of the ionomer in the polymer electrolyte membrane, thereby improving both the ionic conductivity and durability of the polymer electrolyte membrane.

Specifically, the ionomer dispersion of the present disclosure having high dispersion stability exhibits excellent impregnation properties and has a small and uniform particle size, thus enabling water channels, which provide hydrogen ion paths, when a reinforced-composite-membrane-type polymer electrolyte membrane is produced by impregnating and coating the porous support with the ionomer dispersion, to be formed well in both in-plane and through-plane directions, thereby improving both in-plane and through-plane ionic conductivity of the polymer electrolyte membrane.

In addition, the ionomer dispersion having high dispersion stability of the present disclosure has a large reaction surface area, thus effectively increasing the crystallinity of the ionomer through the drying and annealing processes performed following the impregnation/coating process, and eventually minimizing hydrogen permeability of the polymer electrolyte membrane. Therefore, according to the present disclosure, the production of radicals due to the permeation of hydrogen gas through the polymer electrolyte membrane and the degradation of the polymer electrolyte membrane caused thereby can be inhibited, and as a result, the durability of the polymer electrolyte membrane and the electrochemical elements including the same (for example, membrane electrode assemblies, fuel cells, etc.) can be improved.

BRIEF DESCRIPTION OF DRAWINGS

The accompanying drawings, which are provided for better understanding of the present disclosure and constitute a part of the present specification, are given to exemplify the embodiments of the present disclosure and describe the principles and features of the present disclosure with reference to the following detailed description, in which.

BEST MODE

Figure 1:
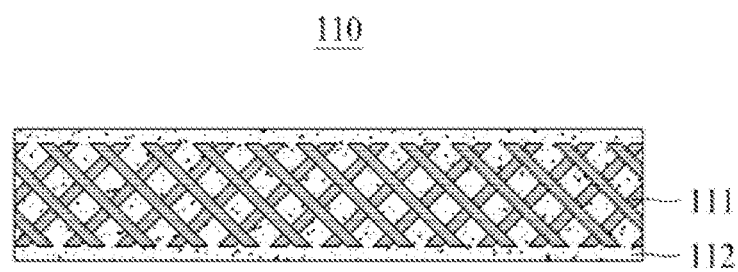
FIG. 1 shows a cross section of a polymer electrolyte membrane according to an embodiment of the present disclosure.
Figure 2:
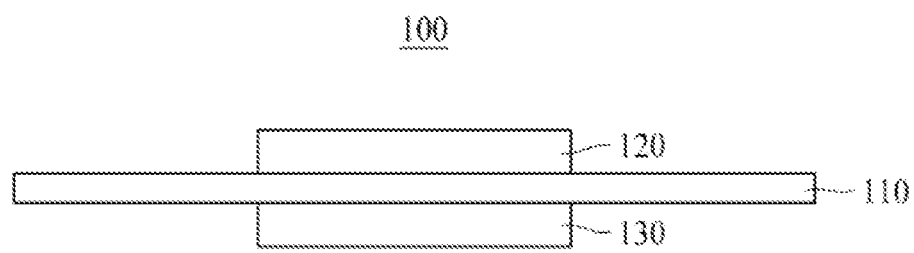
FIG. 2 shows a cross section of a membrane-electrode assembly according to an embodiment of the present disclosure.

Hereinafter, embodiments of the present disclosure will be described in detail with reference to the accompanying drawings. However, the following embodiments are illustratively provided merely for clear understanding of the present disclosure, and do not limit the scope of the present disclosure.

The ionomer dispersion of the present disclosure contains a dispersion medium and an ionomer solid dispersed therein.

The dispersion medium may be water, an organic solvent, or a mixture thereof.

The organic solvent contains, as a backbone (main chain), a linear or branched saturated or unsaturated hydrocarbon having 1 to 12 carbon atoms, and at least one functional group selected from the group consisting of alcohol, isopropyl alcohol, ketone, aldehyde, carbonate, carboxylate, carboxylic acid, ether, and amide. The backbone may include at least a part of an alicyclic or aromatic cyclic compound.

The organic solvent may also be N-methylpyrrolidone, dimethyl sulfoxide, tetrahydrofuran, or a mixture thereof.

According to an embodiment of the present disclosure, the dispersion medium may be a mixture of a hydrophilic organic solvent and water. More specifically, the dispersion medium may be a mixture of $C_1$-$C_{12}$ alcohol and water at a volume ratio of 1:2 to 2:1.

The ionomer solid may contain an ionomer having, in a side chain, at least one ion-conductive group selected from the group consisting of a sulfonic acid group, a carboxyl group, a boronic acid group, a phosphoric acid group, an imide group, a sulfonimide group, a sulfonamide group, and a sulfonic acid fluoride group. For example, the ionomer may be a cation conductor having a sulfonic acid group and/or a carboxyl group in a side chain.

The ionomer may be a fluorinated ionomer, a hydrocarbon-based ionomer, or a mixture thereof.

For example, the ionomer may be a fluorinated ionomer such as poly(perfluorosulfonic acid) or poly(perfluorocarboxylic acid).

The hydrocarbon-based ionomer may be a hydrocarbon-based polymer having the ion conductive group in the side chain [for example, sulfonated polyimide (S-PI), sulfonated polyarylethersulfone (S-PAES), sulfonated polyetheretherketone (SPEEK), sulfonated polybenzimidazole (SPBI), sulfonated polysulfone (S-PSU), sulfonated polystyrene (S-PS), sulfonated polyphosphazene, sulfonated polyquinoxaline, sulfonated polyketone, sulfonated polyphenylene oxide, sulfonated polyether sulfone, sulfonated polyether ketone, sulfonated polyphenylene sulfone, sulfonated polyphenylene sulfide, sulfonated polyphenylene sulfide sulfone, sulfonated polyphenylene sulfide sulfone nitrile, sulfonated polyarylene ether, sulfonated polyarylene ether nitrile, sulfonated polyarylene ether ether nitrile, sulfonated polyarylene ether sulfone ketone, or the like].

According to an embodiment of the present disclosure, the ionomer solid may contain a perfluorinated sulfonic acid-based ionomer (PFSA-based ionomer).

According to the present disclosure, in order to manufacture as dense a polymer electrolyte membrane as possible, the concentration of the ionomer solid in the ionomer dispersion is 20% by weight or more. For example, the concentration of the ionomer solid in the ionomer dispersion may be 20 to 50% by weight.

Optionally, the ionomer dispersion may further contain a radical scavenger capable of decomposing and/or removing peroxides (e.g., hydrogen peroxide) and radicals (e.g., hydrogen radicals) that are produced during redox reactions in fuel cells and cause degradation of polymer electrolyte membranes (more specifically, ionomers) and catalyst electrodes.

For example, the ionomer dispersion may further contain at least one radical scavenger selected from the group consisting of: transition metals such as Ce, Ni, W, Co, Cr, Zr, Y, Mn, Fe, Ti, V, Mo, La, and Nd; noble metals such as Au, Pt, Ru, Pd, and Rh; ions thereof; oxides thereof; and salts thereof.

According to the present disclosure, when a flow sweep is performed by measuring the viscosity of the ionomer dispersion using a rheometer while a shear rate is increasing from $0.001$ $s^{-1}$ to $1,000$ $s^{-1}$ and then decreasing from $1,000$ $s^{-1}$ to $0.001$ $s^{-1}$, the viscosity ratio of the ionomer dispersion, defined by the following Equation 1, is 1.7 or less, preferably 0.5 to 1.5, more preferably 0.7 to 1.3, and still more preferably 0.9 to 1.1:

$$\text{Viscosity ratio} = \eta 2 / \eta 1 \qquad \text{Equation 1:}$$

wherein $\eta 1$ is a first viscosity of the ionomer dispersion, measured while the shear rate is increasing, when the shear rate is 1 $s^{-1}$, and $\eta 2$ is a second viscosity of the ionomer dispersion, measured while the shear rate is decreasing, when the shear rate is 1 $s^{-1}$.

That is, the viscosity ratio is a parameter indicating the dispersion stability of the ionomer dispersion, and as the viscosity ratio becomes closer to 1 (that is, as the difference between the first viscosity and the second viscosity decreases), the dispersion stability of the ionomer dispersion increases. It is ideal for the viscosity ratio to be 1.

An example of the rheometer used to perform the flow sweep to measure the viscosity ratio is Discovery HR-3, produced by TA Instruments, and the measurement conditions are as follows.

Temperature: 25° C.
Soak Time: 0.0 s
Wait For Temperature: Off
Logarithmic sweep
Shear rate: $1.0 \cdot e^{-3}$~$10^3$ $(s^{-1})$
Points per decade: 5
Equilibration time: 1.0 s
Averaging time: 1.0 s According to an embodiment of the present disclosure, both the first and second viscosities may be 1 Pa·s or less.

In addition, according to an embodiment of the present disclosure, when the shear stress of the ionomer dispersion is measured while performing the flow sweep, the shear stress ratio of the ionomer dispersion, defined by the following Equation 2, may be 1.5 or less:

$$\text{Shear stress ratio} = \sigma2/\sigma1 \qquad \text{Equation 2:}$$

wherein σ1 is a first shear stress which is a shear stress of the ionomer dispersion, measured while the shear rate is increasing, when the shear rate is 1 s$^{-1}$, and σ2 is a second shear stress which is a shear stress of the ionomer dispersion, measured while the shear rate is decreasing, when the shear rate is 1 s$^{-1}$.

That is, the viscosity ratio is a primary parameter indicating the dispersion stability of the ionomer dispersion, whereas the shear stress ratio is a secondary parameter indicating the dispersion stability of the ionomer dispersion. That is, as the shear stress ratio becomes closer to 1 (that is, as the difference between the first shear stress and the second shear stress decreases), the dispersion stability of the ionomer dispersion increases. It is ideal for the shear stress ratio to be 1.

According to an embodiment of the present disclosure, both the first shear stress and the second shear stress may be 1·Pa or less.

Hereinafter, a method for preparing an ionomer dispersion according to an embodiment of the present disclosure will be described in detail.

The method for preparing an ionomer dispersion of the present disclosure includes adding an ionomer to a dispersion medium and mixing the dispersion medium with the ionomer.

As described above, the ionomer is generally introduced into the porous support in the form of a dispersion rather than a solution and coated thereon, since the hydrophobic backbone and hydrophilic side chain of the ionomer have different solubilities. Therefore, according to the present disclosure, a dense polymer electrolyte membrane can be manufactured by adding the ionomer to the dispersion medium such that the ionomer dispersion contains an ionomer solid in a large amount of 20% by weight or more.

However, in order to overcome the problem in which the dispersion stability of the dispersion decreases as the concentration of the solid in the dispersion increases, the dispersion medium and the ionomer are mixed using a resonant acoustic method.

The mixing based on the resonant acoustic method may be performed by applying acoustic energy with a frequency of 10 to 100 Hz to the dispersion medium to which the ionomer is added to subject the dispersion medium and the ionomer to resonant vibration at an acceleration of 50 G to 100 G, wherein G is gravitational acceleration.

The mixing based on the resonant acoustic method is performed using, for example, a mixer (model name: LabRAM II) commercially available from Resodyn Acoustic Mixers, Inc.

The mixing based on the resonance sound wave method may be performed for, for example, 5 to 60 minutes.

By adding the ionomer to the dispersion medium, followed by mixing using the resonant acoustic method, an ionomer dispersion having high dispersion stability despite having high content of ionomer solids can be prepared.

According to an embodiment of the present disclosure, the method may further include applying a high pressure of 500 to 1,000 bar to the mixture of the dispersion medium and the ionomer, obtained through the mixing. For example, the pressing may be performed using a homogenizer, and the high pressure described above may be applied to the mixture flowing in the homogenizer.

Optionally, in order to further increase the dispersion stability of the ionomer dispersion, high-pressure dispersion using a homogenizer may be repeated 2 to 5 times.

As the particle size becomes smaller and more uniform due to the pressing, the dispersion stability of the ionomer dispersion is further increased.

In addition, owing to the small and uniform particle size, the ionomer is imparted with a larger reaction surface area, so the crystallinity of the ionomer can be effectively increased through the drying and/or annealing process, and as a result, the hydrogen permeability of the polymer electrolyte membrane can be minimized. Therefore, radicals may be generated due to the permeation of hydrogen gas into the polymer electrolyte membrane and the degradation of the polymer electrolyte membrane can be suppressed, and as a result, the durability of the polymer electrolyte membrane and electrochemical components including the same (e.g., a membrane-electrode assembly, fuel cell, etc.) can be improved.

The polymer electrolyte membrane 110 of the present disclosure can be manufactured by impregnating and coating a porous support 111 having a plurality of pores with the ionomer dispersion of the present disclosure prepared as described above, followed by removing the dispersion medium.

Hereinafter, a method for manufacturing a polymer electrolyte membrane 110 according to an embodiment of the present disclosure will be described in detail.

The porous support 111 may be formed of polytetrafluoroethylene (PTFE) or a copolymer of tetrafluoroethylene and $CF_2=CFC_nF_{2n+1}$ (wherein n is an integer of 1 to 5) or $CF_2=CFO-(CF_2CF(CF_3)O)_mC_nF_{2n+1}$ (wherein m is an integer of 0 to 15 and n is an integer of 1 to 15).

For example, an e-PTFE porous support in the form of an expanded film may be formed by extrusion-molding PTFE on a piece of tape in the presence of a lubricant, followed by expansion and thermal treatment. Additional expansion and thermal treatment may be further performed after the thermal treatment. By controlling the expansion and thermal treatment, e-PTFE porous supports having various microstructures can be formed. For example, the e-PTFE porous support may have a microstructure in which nodes are connected to one another through fibrils or a microstructure consisting only of fibrils.

Alternatively, the porous support 111 may be a nonwoven web. The nonwoven web may be formed with a support-forming liquid containing at least one hydrocarbon-based polymer selected from the group consisting of polyolefin (e.g., polyethylene, polypropylene, polybutylene, etc.), polyester (e.g. PET, PBT, etc.), polyamide (e.g., nylon-6, nylon-6,6, aramid, etc.), polyamic acid (converted to polyimide through imidization after being molded into a web), polyurethane, polybutene, polylactic acid, polyvinyl alcohol, polyphenylene sulfide (PPS), polysulfone, fluid crystalline polymer, polyethylene-co-vinyl acetate, polyacrylonitrile, cyclic polyolefin, polyoxymethylene, and polyolefin-based thermoplastic elastomer elastomers.

The nonwoven web may be produced by any one method selected from the group consisting of wet-laying, electrospinning, carding, garneting, air-laying, melt blowing, spunbonding, and stitch bonding.

The porous support 111 that can be used in the present disclosure may have an average pore diameter of 0.1 to 0.2 μm and a porosity of 60 to 95%.

When the average pore diameter is less than 0.1 μm or the porosity is less than 60%, due to the excessively small amount of the ionomer 112 in the porous support 111, the resistance of the polymer electrolyte membrane 110 is increased and the ionic conductivity is decreased. On the other hand, when the average pore diameter is higher than 0.2 μm or the porosity is higher than 95%, subsequent processing may not proceed smoothly due to the deteriorated shape stability of the polymer electrolyte membrane 110.

Optionally, in order to further improve the mechanical strength of the polymer electrolyte membrane 110 and to allow all pores in the porous support 111 to be sufficiently filled with the ionomer 112, two or more relatively thin porous supports may be used instead of one thick porous support.

When the porous support 111 is prepared, the porous support 111 is impregnated and coated with the ionomer dispersion of the present disclosure. The impregnation and coating may be performed by (i) casting the ionomer dispersion on a substrate and then soaking the porous support 111 with the ionomer dispersion, or (ii) coating the porous support 111 with the ionomer dispersion. The coating may be performed, for example, using bar coating, comma coating, slot die coating, screen printing, spray coating, doctor blade coating, or the like.

Then, drying to remove the dispersion medium from the ionomer dispersion and annealing to increase the crystallinity of the ionomer 112 are sequentially performed.

The drying may be performed at 60° C. to 150° C. for 30 minutes to 2 hours. When the drying temperature is less than 60° C. or the drying time is less than 30 minutes, the dispersion medium may not escape and thus a dense polymer electrolyte membrane may be not formed.

Optionally, the drying may be performed in multiple steps while elevating the temperature within the drying temperature range.

The annealing may be performed at 150° C. to 190° C. for 3 minutes to 1 hour. When the annealing temperature is higher than 190° C. or the annealing time is longer than 1 hour, there are problems in which the ion-conductive group of the ionomer 112 is decomposed and the performance of the polymer electrolyte membrane 110 is deteriorated.

According to an embodiment of the present disclosure, provided are a membrane-electrode assembly 100 including the polymer electrolyte membrane 110 manufactured as described above and a fuel cell including the same.

Specifically, the membrane-electrode assembly 100 includes an anode 120, a cathode 130, and the polymer electrolyte membrane 110 interposed therebetween. The membrane-electrode assembly 100 is the same as a conventional membrane-electrode assembly for a fuel cell except that it uses the polymer electrolyte membrane 110 according to the present disclosure as the polymer electrolyte membrane, and thus a detailed description thereof will be omitted herein.

In addition, the fuel cell is the same as a conventional fuel cell except that it includes the membrane-electrode assembly of the present disclosure, and thus a detailed description thereof will be omitted herein.

Hereinafter, the present disclosure will be described in more detail with reference to specific examples. However, the following examples are provided only for better understanding of the present disclosure, and should not be construed as limiting the scope of the present disclosure.

[Preparation of Ionomer Dispersion]

Example 1a

A PFSA-based ionomer (EW 725) was added to a dispersion medium in which 1-propanol and water were mixed at a weight ratio of 55:45 such that an ionomer solid content was adjusted to 20% by weight. Then, the dispersion medium and the ionomer were mixed by inducing resonance at an acceleration of 90 G using a mixer (Resodyn Acoustic Mixers, Inc., LabRAM II) at room temperature and humidity for 20 minutes (i.e., mixed using a resonant acoustic method) to prepare an ionomer dispersion.

Example 2a

A PFSA-based ionomer (EW 725) was added to a dispersion medium in which 1-propanol and water were mixed at a weight ratio of 30:40 such that an ionomer solid content was adjusted to 30% by weight. Then, the dispersion medium and the ionomer were mixed by inducing resonance at an acceleration of 90 G using a mixer (Resodyn Acoustic Mixers, Inc., LabRAM II) at room temperature and humidity for 20 minutes. Then, high-pressure dispersion of applying a high pressure of 600 bar to the mixture of the dispersion medium and the ionomer using a homogenizer was repeated three times to prepare an ionomer dispersion.

Example 3a

An ionomer dispersion was prepared in the same manner as in Example 1a except that a PFSA-based ionomer (EW 725) was added to a dispersion medium in which 1-propanol and water were mixed at a weight ratio of 49:51 such that an ionomer solid content was adjusted to 30% by weight.

Comparative Example 1a

A PFSA-based ionomer (EW 725) was added to a dispersion medium in which 1-propanol and water were mixed at a weight ratio of 55:45 such that an ionomer solid content was adjusted to 20% by weight. Then, the dispersion medium and the ionomer were mixed at 250 rpm using a magnetic stirrer at room temperature and humidity for 48 hours to prepare an ionomer dispersion.

Comparative Example 2a

A PFSA-based ionomer (EW 725) was added to a dispersion medium in which 1-propanol and water were mixed at a weight ratio of 47:53 such that an ionomer solid content was adjusted to 25% by weight. Then, the dispersion medium and the ionomer were mixed at 250 rpm using a magnetic stirrer at 50° C. for 48 hours to prepare an ionomer dispersion.

[Evaluation of Dispersion Stability of Ionomer Dispersions]

The dispersion stability of the ionomer dispersions prepared in Examples and Comparative Examples was evaluated while performing a flow sweep. Specifically, the viscosity and shear stress of the ionomer dispersion were measured under the following conditions using a "Discovery HR-3" rheometer from TA Instruments, while the shear rate was increasing from $0.001 \text{ s}^{-1}$ to $1,000 \text{ s}^{-1}$ and then decreasing from $1,000 \text{ s}^{-1}$ to $0.001 \text{ s}^{-1}$.

Temperature: 25° C.
Soak Time: 0.0 s
Wait For Temperature: Off
Logarithmic sweep
Shear rate: $1.0 \cdot e^{-3} \sim 10^3 \text{ (s}^{-1})$
Points per decade: 5
Equilibration time: 1.0 s
Averaging time: 1.0 s The viscosity ratio of the ionomer dispersion defined by the following Equation 1 and the ionomer shear stress ratio defined by the following Equation 2 were calculated, and the results are shown in Table 1.

Viscosity ratio=η2/η1                              Equation 1:

Shear stress ratio=σ2/σ1                          Equation 2:

wherein η1 and σ1 respectively represent the viscosity and shear stress of the ionomer dispersion when the shear rate is 1 s$^{-1}$, measured while the shear rate is increasing, and η2 and σ2 respectively represent the viscosity and shear stress of the ionomer dispersion when the shear rate is 1 s$^{-1}$, measured while the shear rate is decreasing.

TABLE 1

|  | η1 (Pa · s) | η2 (Pa · s) | η2/η1 | σ1 (Pa) | σ2 (Pa) | σ2/σ1 |
|---|---|---|---|---|---|---|
| Example 1a | 0.402 | 0.507 | 1.26 | 0.400 | 0.434 | 1.09 |
| Example 2a | 0.226 | 0.228 | 1.01 | 0.226 | 0.228 | 1.01 |
| Example 3a | 0.620 | 0.965 | 1.56 | 0.625 | 0.875 | 1.40 |
| Comparative Example 1a | 0.515 | 3.000 | 5.83 | 0.523 | 1.305 | 2.50 |
| Comparative Example 2a | 0.610 | 1.067 | 1.75 | 0.605 | 0.968 | 1.60 |

Figure 3:
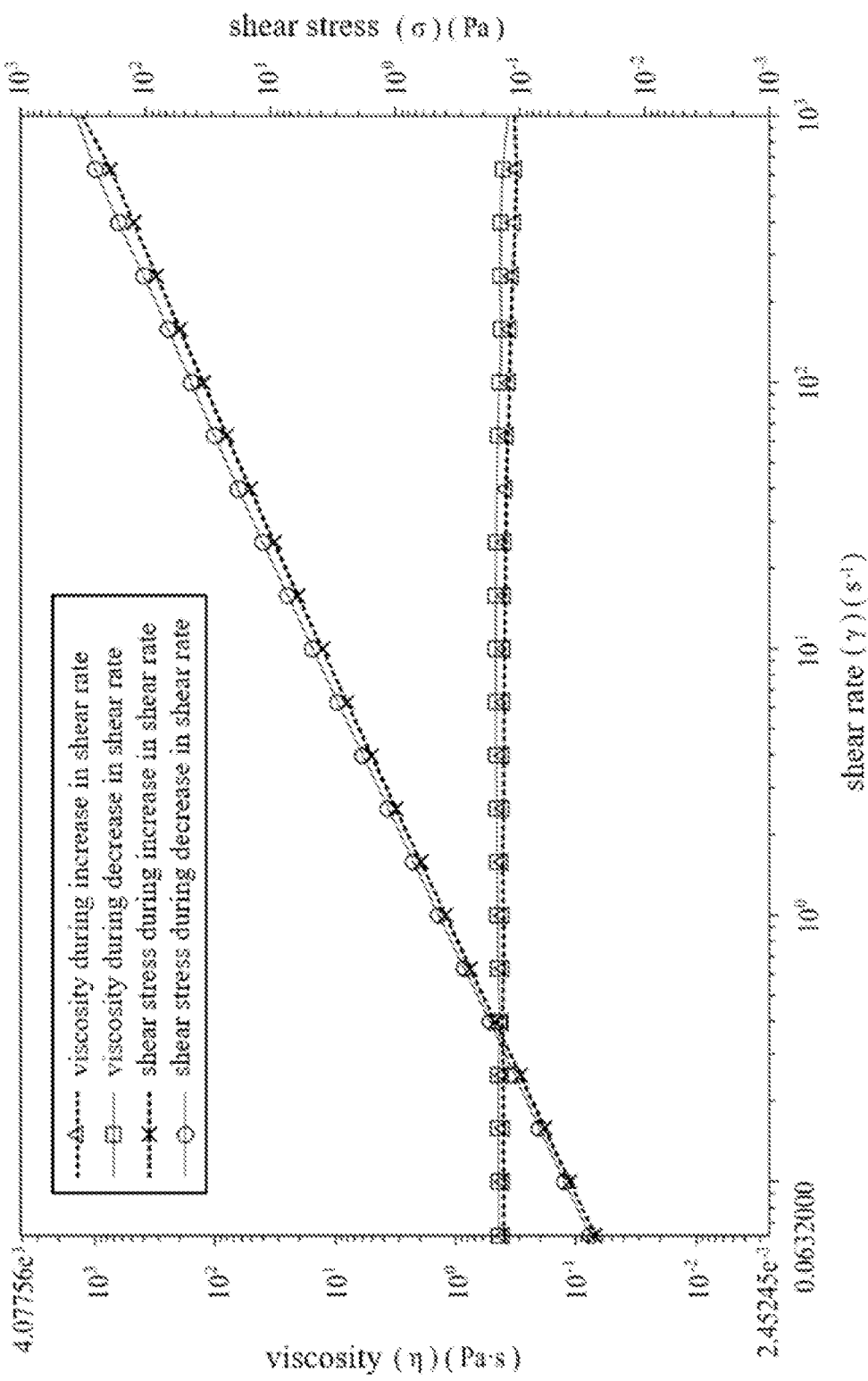
FIG. 3 is a graph showing the viscosity and shear stress of the ionomer dispersion of Example 1a measured while performing a flow sweep.
Figure 4:
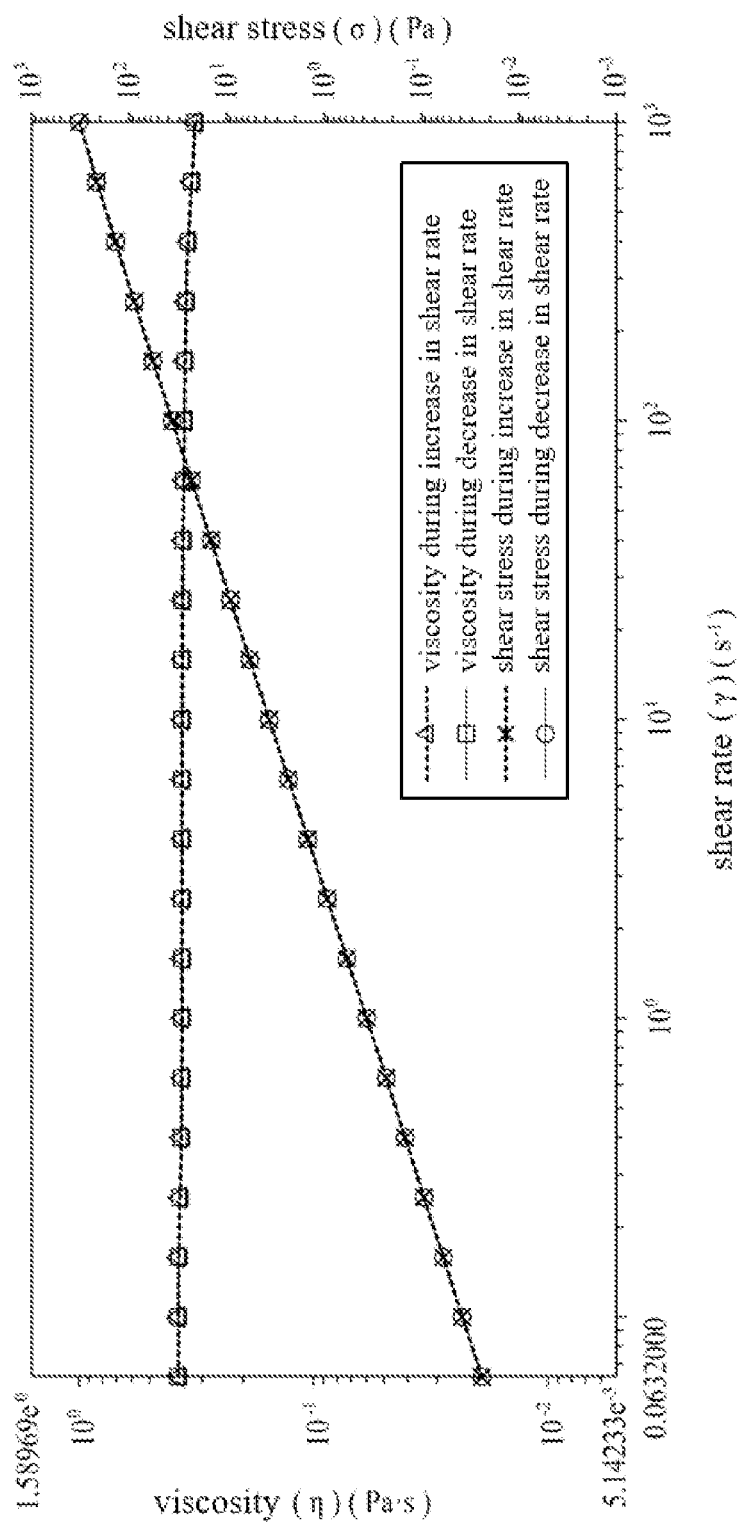
FIG. 4 is a graph showing the viscosity and shear stress of the ionomer dispersion of Example 2a measured while performing a flow sweep.
Figure 5:
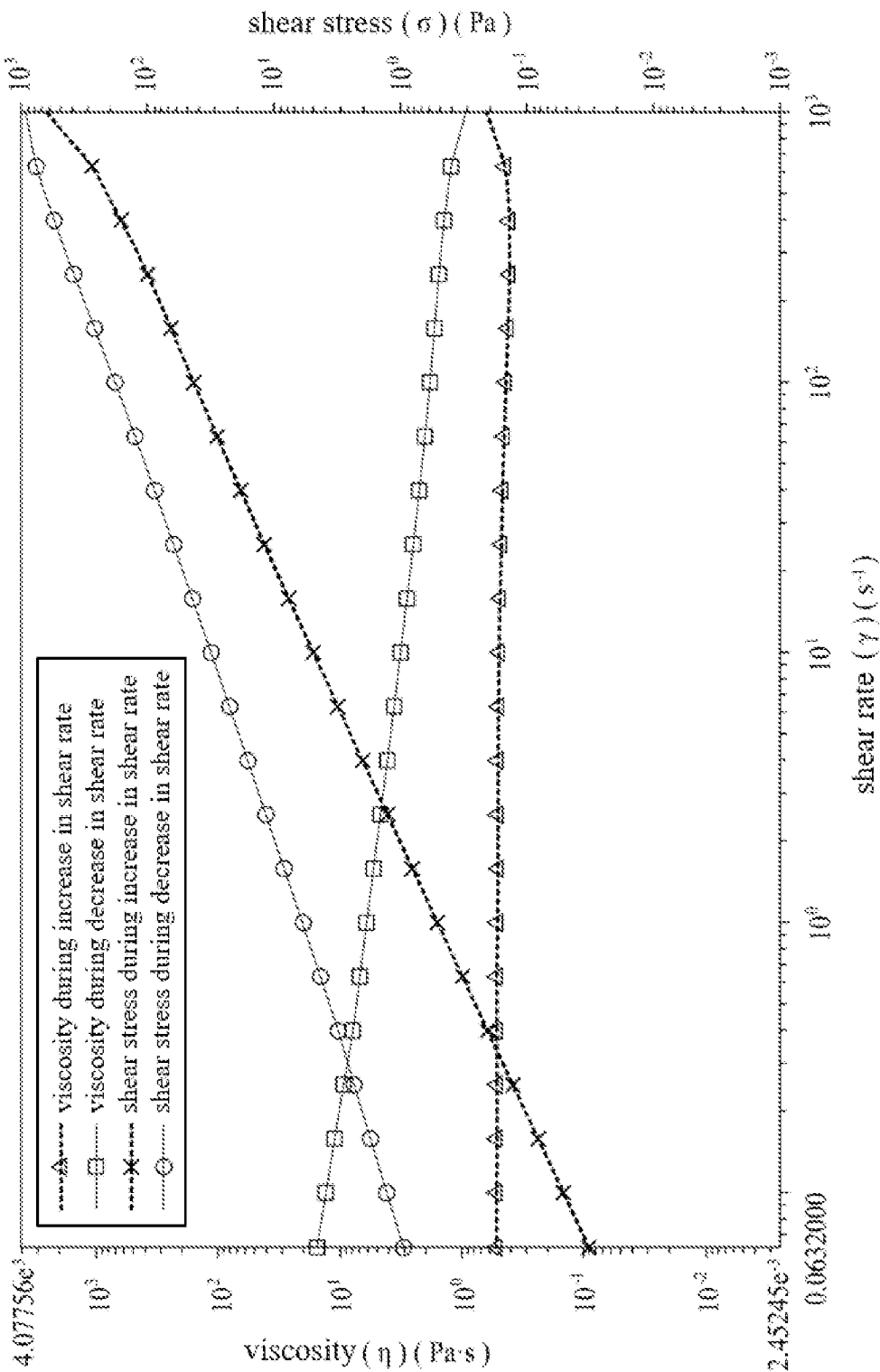
FIG. 5 is a graph showing the viscosity and shear stress of the ionomer dispersion of Comparative Example 1a measured while performing a flow sweep.

FIGS. 3 to 5 are graphs respectively illustrating the viscosity and shear stress of the ionomer dispersions of Example 1a, Example 2a, and Comparative Example 1a, measured while performing a flow sweep.

As can be seen from the graph of FIG. 3 and Table 1, in the ionomer dispersion of Example 1a, prepared by a resonant acoustic method, the viscosity and shear stress measured while the shear rate was increasing were very similar to those measured while the shear rate was decreasing, and the viscosity ratio and shear stress ratio respectively defined by Equation 1 and Equation 2 were less than 1.3, which means that the ionomer dispersion of Example 1a exhibited very high dispersion stability.

As can be seen from the graph of FIG. 4 and Table 1, in the ionomer dispersion of Example 2a, prepared by additionally performing a high-pressure dispersion process following the mixing process based on the resonant acoustic method, the viscosity and shear stress measured while the shear rate was increasing were substantially the same as those measured while the shear rate was decreasing, and the viscosity ratio and shear stress ratio respectively defined by Equations 1 and 2 reached about 1, which means that the ionomer dispersion of Example 2a exhibits the maximum dispersion stability.

As shown in Table 1, the ionomer dispersion of Example 3a, containing a higher amount of ionomer solid, exhibited a higher viscosity ratio and shear stress ratio compared to Example 1a, but exhibited a low viscosity ratio less than 1.7 (i.e., 1.56) and a low shear stress ratio less than 1.5 (i.e., 1.40) because it was prepared through the mixing process based on the resonant acoustic method, as in Example 1a.

Meanwhile, as can be seen from the graph of FIG. 5 and Table 1, in the ionomer dispersion of Comparative Example 1a prepared through a mixing process using a conventional magnetic stirrer, the viscosity and shear stress measured while the shear rate was increasing were remarkably different from those measured while the shear rate was decreasing, and the dispersion stability of the ionomer dispersion was so low that the viscosity and shear stress ratios, respectively defined by Equations 1 and 2, were higher than 2.

On the other hand, the ionomer dispersion of Comparative Example 2a, prepared by performing mixing at a higher temperature, exhibited a lower viscosity ratio and shear stress ratio compared to Comparative Example 1a, but exhibited a high viscosity ratio exceeding 1.7 (i.e., 1.75) and a high shear stress ratio exceeding 1.5 (i.e., 1.60) because it was prepared through a mixing process using a conventional magnetic stirrer, as in Comparative Example 1a.

[Production of Polymer Electrolyte Membrane]

Example 1b

Two pieces of e-PTFE porous supports each having an average pore diameter of 0.15 μm and a porosity of 75% were laminated, and the ionomer dispersion of Example 1a was applied to both the upper and lower surfaces thereof. Subsequently, the resulting structure was sequentially subjected to drying and annealing processes to manufacture a reinforced-composite-membrane-type polymer electrolyte membrane. The drying process was performed at 80° C. for 1 hour, and the annealing process was performed at 180° C. for 10 minutes.

Example 2b

A polymer electrolyte membrane was manufactured in the same manner as in Example 1b, except that the ionomer dispersion of Example 2a was used instead of the ionomer dispersion of Example 1a.

Example 3b

A polymer electrolyte membrane was manufactured in the same manner as in Example 1b, except that the ionomer dispersion of Example 3a was used instead of the ionomer dispersion of Example 1a.

Comparative Example 1b

A polymer electrolyte membrane was manufactured in the same manner as in Example 1b, except that the ionomer dispersion of Comparative Example 1a was used instead of the ionomer dispersion of Example 1a.

Comparative Example 2b

A polymer electrolyte membrane was manufactured in the same manner as in Example 1b, except that the ionomer dispersion of Comparative Example 2a was used instead of the ionomer dispersion of Example 1a.

[Measurement of Properties of Polymer Electrolyte Membrane]

The (i) in-plane ionic conductivity, (ii) water uptake, (iii) through-plane resistance, and (iv) hydrogen permeability of the polymer electrolyte membranes of Examples and Comparative Examples were measured according to the following methods, and the results are shown in Table 2.

In-Plane Ionic Conductivity & Water Uptake

The in-plane ionic conductivity and water uptake of the polymer electrolyte membrane at 80° C. and 50 RH % were each measured using a magnetic suspension balance device (Bell Japan).

Through-Plane Resistance

The through-plane resistance of the polymer electrolyte membrane at 80° C. and 50 RH % was measured using a membrane test system from Scribner (model name: MTS 740).

Hydrogen Permeability

The hydrogen permeability of the polymer electrolyte membrane at 65° C. and 50 RH % was measured using gas chromatography.

TABLE 2

|  | In-Plane ionic conductivity (S/cm) | Through-Plane resistance (Ω) | Water uptake (%) | Hydrogen permeability (cm²/sec) |
|---|---|---|---|---|
| Example 1b | 0.049 | 0.25 | 15 | 6.40E−05 |
| Example 2b | 0.055 | 0.19 | 15 | 4.47E−05 |
| Example 3b | 0.050 | 0.27 | 16 | 7.00E−05 |
| Comparative Example 1b | 0.040 | 0.34 | 15 | 2.02E−04 |
| Comparative Example 2b | 0.041 | 0.35 | 16 | 1.58E−04 |

As can be seen from Table 2, the polymer electrolyte membranes of Examples 1b and 2b manufactured using ionomer dispersions having high dispersion stability exhibited the same water uptake as the polymer electrolyte membrane of Comparative Example 1b, manufactured using an ionomer dispersion having low dispersion stability, but exhibited (i) higher in-plane ionic conductivity, (ii) lower through-plane resistance, and (iii) lower hydrogen permeability.

In addition, the polymer electrolyte membrane of Example 2b, manufactured using the ionomer dispersion of Example 2a imparted with maximized dispersion stability by additionally performing a high-pressure dispersion process in addition to the mixing process based on a resonant acoustic method of the present disclosure, exhibited the best in-plane and through-plane ionic conductivity as well as the best hydrogen permeability (that is, the lowest hydrogen permeability).

On the other hand, the polymer electrolyte membrane of Example 3b, manufactured using the ionomer dispersion of Example 3a, having a viscosity ratio slightly lower than 1.7 (i.e., 1.56) and a shear stress ratio slightly lower than 1.5 (i.e., 1.40), also exhibited excellent physical properties in terms of ion conductivity and hydrogen permeability, albeit lower than those of the polymer electrolyte membranes of Examples 1b and 2b.

In contrast, the polymer electrolyte membrane of Example 3b, manufactured using the ionomer dispersion of Example 3a having a viscosity ratio slightly higher than 1.7 (i.e., 1.75) and a shear stress ratio slightly higher than 1.5 (i.e., 1.60), exhibited physical properties inferior to those of the polymer electrolyte membrane of Example 3b. In particular, the hydrogen permeability of the polymer electrolyte membrane of Example 3b was at least double that of the polymer electrolyte membrane of Example 3b. This indicates that the polymer electrolyte membrane manufactured using the ionomer dispersion having a viscosity ratio higher than 1.7 and/or a shear stress ratio higher than 1.5 did not exhibit satisfactory ion conductivity or hydrogen permeability.

The invention claimed is:

1. An ionomer dispersion comprising:
   a dispersion medium; and
   an ionomer solid in the dispersion medium,
   wherein a concentration of the ionomer solid in the ionomer dispersion is 20% by weight or more, and
   when a viscosity of the ionomer dispersion is measured using a rheometer while a shear rate is increasing from $0.001 \text{ s}^{-1}$ to $1,000 \text{ s}^{-1}$ and then decreasing from $1,000 \text{ s}^{-1}$ to $0.001 \text{ s}^{-1}$, a viscosity ratio of the ionomer dispersion defined by the following Equation 1 is 1.7 or less:

$$\text{Viscosity ratio} = \eta 2/\eta 1 \qquad \text{Equation 1:}$$

wherein η1 is a first viscosity of the ionomer dispersion, measured while the shear rate is increasing, when the shear rate is $1 \text{ s}^{-1}$, and
   η2 is a second viscosity of the ionomer dispersion, measured while the shear rate is decreasing, when the shear rate is $1 \text{ s}^{-1}$.

2. The ionomer dispersion according to claim 1, wherein the first viscosity and the second viscosity are 1 Pa·s or less.

3. The ionomer dispersion according to claim 1, wherein, when a shear stress of the ionomer dispersion is measured using a rheometer while the shear rate is increasing from $0.001 \text{ s}^{-1}$ to $1,000 \text{ s}^{-1}$ and then decreasing from $1,000 \text{ s}^{-1}$ to $0.001 \text{ s}^{-1}$, a shear stress ratio of the ionomer dispersion defined by the following Equation 2 is 1.5 or less:

$$\text{Shear stress ratio} = \sigma 2/\sigma 1 \qquad \text{Equation 2:}$$

wherein σ1 is a first shear stress which is a shear stress of the ionomer dispersion, measured while the shear rate is increasing, when the shear rate is $1 \text{ s}^{-1}$, and
   σ2 is a second shear stress which is a shear stress of the ionomer dispersion, measured while the shear rate is decreasing, when the shear rate is $1 \text{ s}^{-1}$.

4. The ionomer dispersion according to claim 3, wherein the first shear stress and the second shear stress are 1 Pa·s or less.

5. The ionomer dispersion according to claim 1, wherein the ionomer solid comprises a fluorinated ionomer, a hydrocarbon-based ionomer, or a mixture thereof.

6. The ionomer dispersion according to claim 1, wherein the ionomer solid comprises a perfluorinated sulfonic acid-based ionomer (PFSA-based ionomer).

7. The ionomer dispersion according to claim 1, wherein the concentration of the ionomer solid in the ionomer dispersion is 20 to 50% by weight.

8. A method for preparing the ionomer dispersion according to claim 1, the method comprising:
   adding an ionomer to a dispersion medium such that a content of an ionomer solid is adjusted to 20% by weight or more; and
   mixing the dispersion medium with the ionomer using a resonant acoustic method so as to obtain the ionomer dispersion having the viscosity ratio of 1.7 or less.

9. The method according to claim 8, wherein the mixing comprises applying acoustic energy with a frequency of 10 to 100 Hz to the dispersion medium and the ionomer, whereby subjecting the dispersion medium and the ionomer to resonant vibration at an acceleration of 50G to 100G, wherein G is gravitational acceleration.

10. The method according to claim 8, wherein the mixing is performed for 5 to 60 minutes.

11. The method according to claim 8, further comprising applying a pressure of 500 to 1,000 bar to a mixture of the dispersion medium and the ionomer, obtained through the mixing.

12. The method according to claim 11, wherein the pressure is applied to the mixture when the mixture is flowing.

13. A polymer electrolyte membrane comprising:
   a porous support having a plurality of pores; and
   an ionomer formed by impregnating and coating the porous support with the ionomer dispersion according to claim 1, and then removing the dispersion medium from the ionomer dispersion, such that the polymer electrolyte membrane has (i) in-plane ionic conductivity of 0.049 S/cm or more, (ii) through-plane resistance of 0.27Ω or less, and (iii) hydrogen permeability of 7.00E-0.5 or less.

14. A membrane-electrode assembly comprising:
an anode;
a cathode; and
the polymer electrolyte membrane according to claim 13, interposed between the anode and the cathode.

* * * * *